United States Patent [19]
Wrobel et al.

[11] Patent Number: 5,116,558
[45] Date of Patent: May 26, 1992

[54] METHOD OF FORMING GASKETS BY INJECTION AND COMPOSITIONS FOR USE THEREIN

[75] Inventors: Peter Wrobel, Dublin; James Houlihan, County Clare, both of Ireland

[73] Assignee: Loctite (Ireland) Limited, Dublin, Ireland

[21] Appl. No.: 546,212

[22] Filed: Jun. 28, 1990

[30] Foreign Application Priority Data

Jul. 11, 1989 [IE] Ireland .................. 2231/89

[51] Int. Cl.⁵ ............................ B29C 67/22
[52] U.S. Cl. .................... 264/46.6; 264/53; 264/54; 264/267
[58] Field of Search ........ 264/261, 262, 46.5, 264/46.9, 328.1, 54, 252, 53, 267

[56] References Cited

U.S. PATENT DOCUMENTS

| | | | |
|---|---|---|---|
| 3,218,305 | 11/1965 | Krieble | 156/332 |
| 3,425,988 | 2/1969 | Gorman et al. | 156/331.7 |
| 3,864,181 | 2/1975 | Wolinski et al. | 264/46.4 |
| 4,196,162 | 4/1980 | Stichter | 264/261 |
| 4,240,999 | 12/1980 | Decker, Jr. | 264/46.5 |
| 4,592,886 | 6/1986 | Mannherz | 264/261 |
| 4,770,836 | 9/1988 | Vetter et al. | 264/261 |
| 4,806,294 | 2/1989 | Lapierre et al. | 264/54 |

FOREIGN PATENT DOCUMENTS 58-002376  1/1983  Japan .
58096672   6/1988  Japan .
1145110    6/1989  Japan .
1295078   11/1989  Japan .

*Primary Examiner*—Robert A. Dawson
*Assistant Examiner*—Allan R. Kuhns
*Attorney, Agent, or Firm*—Edward K. Welch, II.; Eugene F. Miller

[57] ABSTRACT

A method of forming a gasket in situ between two components which includes injecting into a groove in at least one of said components a curable composition including:

one or more free-radical polymerizable vinyl esters, and ingredients of a rapid free-radical cure system therefor, the cure system being inactivated prior to injection of the composition, and the composition having a viscosity at 25° C. in the range from 200 to 500,000 mPas;

and permitting the composition to cure.

The composition can be a two part composition wherein the first part contains a prepolymer, monomer and activator and the second part a prepolymer, monomer and activator. The composition can also include two expansion reactants, each in a separate part of the composition prior to injection, which react to form a gas in situ in the composition. The gasketing composition is suitable for use in engines and other machines e.g. in industrial manufacturing plants.

10 Claims, 1 Drawing Sheet

METHOD OF FORMING GASKETS BY INJECTION AND COMPOSITIONS FOR USE THEREIN

BACKGROUND OF THE INVENTION

1. Field of the Invention

This invention relates to a method of forming gaskets by injection and compositions for use therein, particularly acrylic compositions and compositions which incorporate an expansion system.

There is a demand for gasketing compositions which can be injected between two components, for example in an engine or other machine, and which will then polymerise in situ. The two components will have been assembled face-to-face, normally with two flat faces such as on mating flanges. A gasketing composition will then be injected into a groove in one of the faces, so that the composition flows along the groove until it is distributed throughout the length of the groove, which forms a sealing path around the area of the mating surfaces. The composition fills the groove and flows into microscopic gaps between the two contiguous surfaces. The composition then cures in situ to form the gasket. Such gasketing compositions should be usable not only in industrial manufacturing plants but also in repair shops where engines and the like are serviced.

2. Description of the Related Art

It has been proposed to use single-component polysiloxane block copolymers for in situ gasketing. However, polysiloxane block copolymers have a high viscosity even prior to curing—a viscosity of 500,000 to $1 \times 10^6$ mPas being normal. This high viscosity results in difficulties during application of the uncured composition by injection. In particular, due to the poor flow characteristics, coverage of large areas is time consuming, application of the composition to narrow, deep grooves is difficult, and furthermore high pressures are required to ensure uniform surface coverage. Due to the nature of gasketing, fluid-tight seals are required and hence uniform coverage is essential. A further disadvantage of polysiloxane block polymers is that polymerization in-situ requires a relatively long cure period. In summary, application of polysiloxane copolymers requires high pressures, sophisticated equipment and prolonged cure periods. High pressures are not available in repair shops and even in industrial premises they may be undesirable due to the risk of misuse or of deformation of components between which a gasket is being formed.

U.S. Pat. No. 4,731,982 Grant et. al. assigned to Loctite (Ireland) Limited describes a method of sealing leaking gas pipe joints by injecting a catalyzed acrylic monomer composition into the leaking joint and curing the composition in the joint to seal the leak. Suitable injectable sealants described therein are mixtures of long chain mono-acrylic esters, hydroxy functional acrylic esters, acid monomers, plasticisers and polyfunctional acrylic esters. The viscosity of the compositions is preferably no greater than 100 cps (mPas), and suitably less than 50 cps (mPas). Although no cure time is specified therein, the Examples mention cure times of 24 hours (Example 1), 1 day, 2 days or 7 days (Example 2) or gellation times of 40 minutes (Example 3) or 10 minutes (Example 5). A composition with a very low viscosity and a long cure time would not be suitable for use in a gasketing application, where significant gaps occur between engineering components and a composition with a viscosity of less than 100 mPas would flow out through the gaps before gelation occurred.

U.S. Pat. No. 4,772,031 Poppo describes a sealant system for repairing leaking pipes comprised of an elastomeric modified acrylic adhesive, exothermically curable upon activation by a catalyst, and a blowing agent. A two compartment container is used to hold, mix and inject the sealant into a mould surrounding the leaking pipe. One compartment of the container is filled with a mixture of the elastomeric modified acrylic, a filler, a plasticizer and a blowing agent such as p.p-oxybis (benzenesulfonyl hydrazide). The second compartment is filled with a free radical polymerisation catalyst such as benzoyl peroxide. After mixing the components, the sealant is pumped into the mould cavity prior to significant reaction of the acrylic. The mould is sealed and the reaction of the acrylic proceeds to completion concomitant with a rise in temperature, decomposition of the blowing agent and an increased pressure within the mould. The internal pressure thus generated forces the sealant into the interstices of the pipe. The sealant upon complete curing and solidification is bonded to the surface of the pipe.

The Poppo Patent is concerned with the formation of a sealing sleeve around a pipe joint and is therefore dealing with much larger volumes of composition than would be used for injection gasketing. The mould cavity 66 described by Poppo has a large volume and is sealed at its edges by rubber gaskets 64. Therefore the viscosity of the uncured composition is not of significance to the Poppo system and is not mentioned in the Patent. Likewise the cure time is not mentioned, although the test described at column 4 line 67-column 5 line 6 not carried out until the seal had cured for 12 hours. The Poppo Patent does not contain any teaching about the special requirements of injection gasketing.

U.S. Pat. Nos. 4,582,551 Parkes et. al., and 4,673,449 Webb et. al., describe methods of sealing pipe joints or leaks with anaerobic monomers. These are low viscosity liquids.

U.S. Pat. No. 4,439,600 Moran assigned to Loctite Corporation describes cure-to-elastomer compositions which, depending on their formulation, may be used as sealing compounds, gasketing compounds, adhesives and the like. The cure-to-elastomer composition comprises (A) a moderate-to-long chain di or polyfunctional prepolymer having vinyl reactive ends, (B) a cross-link controlling material which is (i) reactive with said moderate-to-long chain di- or polyfunctional prepolymer, and (ii) soluble in or miscible with the moderate-to-long chain prepolymer and (C) a free radical polymerization initiator. A surface activator may be used to increase the speed of cure but is not required (column 11 lines 57-column 12 line 8).

The compositions of the Moran Patent are said to be useful as resilient adhesives, inter alia in gaskets. However there is no mention of gaskets formed by injection and no consideration of the problems involved in injection gasketing.

In general, polymerization of polymer precursors results in a decrease in volume. This volume reduction is of particular importance in gasketing applications wherein a decrease in volume upon polymerization in-situ may result in a poor unreliable seal.

U.S. Pat. No. 4,772,031 Poppo (already mentioned) describes a pipe sealant composition which contains a heat-activated blowing agent. The blowing agent decomposes releasing gaseous by-product during exothermic reaction of the activated acrylic adhesive. The sleeve seal produced by Poppo (see FIG. 1 thereof) is exposed on its external surface and therefore Poppo does not provide any teaching concerning shrinkage in a gasket formed between two mating components. The bulk of the composition used by Poppo is sufficiently great for an exothermic reaction to be effective in decomposing the blowing agent; as shown in FIG. 7 of Poppo, the temperature in the reaction mixture rises to substantially in excess of 100° C. and is maintained at that level for several minutes. However in a gasketing composition extending along a groove between two mating components the dissipation of any heat generated in the reaction mixture would be too rapid for the decomposition of a heat-activated blowing agent to be initiated and/or sustained.

SUMMARY OF THE INVENTION

It is an object of the present invention to provide a method of injection gasketing by use of improved curable compositions and to provide compositions which overcome the problem of volume reduction.

The present invention provides a method of forming a gasket in situ between two components which comprises injecting into a groove in at least one of said components a curable composition comprising:
  one or more free-radical polymerizable vinyl esters, and
  ingredients of a rapid free-radical cure system therefor, the cure system being inactivated prior to injection of the composition, and
  the composition having a viscosity at 25° C. in the range from 200 to 500,000 mPas;
and permitting the composition to cure in situ.

The viscosity referred to is the viscosity of the composition at the time of injection. The preferred viscosity range is from 2,000 to 15,000 mPas, more particularly 4,000 to 10,000 mPas, for example 6,000 to 10,000 mPas. The viscosity of the composition within the desired range may be achieved by selection of the monomer(s) and/or by addition of fillers and/or thickeners to the composition.

All viscosity measurements referred to herein are measured at 25° C. using a Brookfield RVT viscometer at 20 r.p.m.

By a "rapid cure system" is meant a cure system which causes the composition to gell to a non-flowable state in 5 minutes, preferably 3 minutes, from the commencement of curing. The cure system usually comprises a free-radical polymerization initiator and, if required for activation of the initiator, a polymerization activator. An activator is generally required in order to achieve a rapid cure. A redox cure system is preferred.

Preferably the cure system is inactivated prior to injection of the composition by isolating the initiator and the activator from each other prior to injection. The initiator and the activator come into contact with each other at the time of injection and this causes rapid curing of the composition.

A rapid cure is necessary in order to achieve sealing within a short time and to stop excessive flow of the composition. A groove for forming a gasket typically has a cross section up to 3 mm×3 mm. Cure must therefore be achieved through a volume of composition which, while much smaller is scale than the sealing sleeve of U.S. Pat. No. 4,772,031 Poppo, is significantly larger than would be involved in sealing threaded fasteners or in sealing porosities in gas pipes e.g. as described in U.S. Pat. No. 4,731,982 Grant et al.

As an alternative to using an initiator and an activator which are isolated from one another, a UV-activated or heat-activated initiator may be used without an activator compound, provided that the desired rapid cure system is achieved. A further alternative for a rapid cure system is the use of an activator applied as a primer to the surface of one of the components between which the gasket is being formed.

It is preferred that the composition does not rely on contact with trace materials (e.g. iron) on a substrate surface for activation, so that the composition is not surface-dependent but can be used on plastics or aluminium or a variety of metal components.

In a preferred embodiment of the method according to the invention, the composition is a multi-part composition wherein one part contains the initiator and another part contains the activator, and the method includes mixing the parts at the time of injection to form a fluid having a viscosity at 25° C. in the range from 200 to 500,000 mPas. Preferably the parts before mixing are of approximately equal viscosity.

In a particular preferred embodiment, the free-radical polymerizable vinyl esters comprise
  (A) a moderate-to-long chain di- or polyfunctional prepolymer having vinyl reactive ends; and
  (B) a cross-link controlling monomer which is
    (a) reactive with said moderate-to-long chain prepolymer, and
    (b) soluble in or miscible with the moderate-to-long chain prepolymer.

In a gasket for use in a dynamic environment such as an engine, it is advantageous for the composition to cure to a flexible solid.

Preferably, the composition further comprises a filler, preferably a polymeric liquid filler, whereby volume reduction upon polymerization of the composition is minimized.

In one aspect, the present invention provides a curable injectable gasket composition which incorporates ingredients for expanding the volume of the composition in situ at room temperature, preferably two reactive ingredients which react at room temperature to produce a gas in situ in the composition, the two reactive ingredients being isolated from each other prior to injection of the composition. In the preferred multi-part composition, one of the ingredients is contained in one part of the composition and the other ingredient is contained in another part of the composition. When the two reactive ingredients are mixed, they react to produce a gas which causes the composition to expand, thus compensating for shrinkage which might occur upon polymerisation.

It is particularly advantageous to combine the volume expansion system and the rapid cure system as described above. For the best results it is important that gelling of the composition occurs at the same time as foaming, so that the gas does not escape from the composition but is trapped as discrete bubbles. Thus it is preferred that both foaming and gelling take place within a period of 3 minutes from
  (i) the end of isolation of the polymerisation activator from the initiator, and
  (ii) the end of isolation of one of the reactive ingredients of the expansion system from the other.

Normally the termination of such isolation is achieved at the time of injection of the composition e.g.

by mixing or rupture of a barrier between respective ingredients.

Monomers the polymerizable vinyl ester monomers are preferably acrylate ester monomers which may be monofunctional, difunctional or polyfunctional, or a combination of mono-, di- and polyfunctional monomers of the kinds described in U.S. Pat. Nos. 4,451,615 Charnock or 4,180,640 Melody et al, the contents of which are incorporated herein by reference. Generally such monomers are exemplified by but not limited to alkyl acrylates, cycloalkyl acrylates, alkyl methacrylates, cycloalkyl methacrylates, alkoxy acrylates, alkoxy methacrylates, alkylene diacrylates. The most preferred are those monomers which have high boiling points and low volatility characteristics, including such monomers as tetrahydrofurfuryl methacrylate, cyclohexyl methacrylate, isobornyl methacrylate, hydroxyethyl methacrylate and hydroxypropyl methacrylate.

The monofunctional monomers mentioned above may generally be represented by the formula $$CH_2=C(R^1) COOR^2$$

wherein $R^1$ is H, $CH_3$ or lower alkyl, $R^2$ is H, alkyl, alkoxy, cycloalkyl, or alkylene group.

Preferred polyfunctional monomers are dimethacrylates of various monomers. These monomers are disclosed in U.S. Pat. No. 3,218,305 and are of the general formula

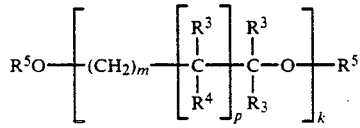

wherein $R^3$ is H, $C_{1-4}$ alkyl or hydroxyalkyl or $R^5OCH_2$-; $R^6$ is H, halogen or $C_{1-4}$ alkyl; $R^4$ is H, OH or $R^5O$-; $R^5$ is $CH_2=CR^6 C(O)$-; m is an integer, preferably 1 to 8; k is an integer, preferably 1 to 20; and p is 0 to 1.

Other suitable polymerizable acrylate ester monomers are described in U.S. Pat. Nos. 4,018,851 and 3,425,988.

It is most preferred to use a combination of a moderate-to-long chain prepolymer (A) and a crosslinking material (B) as defined above.

Suitable moderate-to-long chain prepolymers (A) and crosslink controlling materials (B) are described in U.S. patent specification No. 4,439,600 the contents of which are incorporated herein by reference. The moderate-to-long chain di- or polyfunctional prepolymers having vinyl reactive ends (A) preferably comprise polyetherurethane and/or polyester-urethane derivatives which may be synthesised by reacting a polyester diol or a polyether diol with a diisocyanate and reacting the resulting product with a polymerizable acrylic or methacrylic acid ester, or vinyl reactive alcohol such as allyl alcohol, to produce end-capping. Suitable polyester diols or polyether diols which provide a flexible backbone have an approximate molecular weight in the range 250–7,000, preferably 1,000 to 5,000.

Examples of preferred polyester diols include Desmodure 1700 which is manufactured by the Mobay Chemical Corporation and Inolex 1400-120 which is manufactured by the Inolex Company. Other suitable polyester diols include those formed by the reaction of a glycol of at least two carbon atoms with a dicarboxylic acid of more than three carbon atoms.

Suitable diisocyanates are those of the general formula

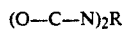

wherein R is a $C_{2-20}$ alkylene, alkenylene or cycloalkylene radical or a $C_{6-40}$ arylene, alkarylene or aralkylene, the preferred diisocyanate being toluene diisocyanate (TDI).

The polymerizable acrylate and methacrylate ester monomers and reactive vinyl alcohols may be mono-or di-functional. Monofunctional monomers such as hydroxyalkyl (meth)acrylates and aminoalkyl (meth)acrylates are preferred. The most preferred ester monomers are hydroxyethyl methacrylate and hydroxypropyl methacrylate.

As an alternative to the polyether urethane (meth)acrylates and polyester urethane (meth)acrylates, the following may also be used:

Polybutadiene urethane (meth)acrylates; polybutadiene (meth)acrylates; epoxy (meth)acrylates; polyester (meth)acrylates; silanic (meth)acrylates; alkoxylated aliphatic (meth)acrylates.

In a preferred embodiment of the invention, a dimethacrylate terminated urethane polyester is used as prepolymer (A).

In the preferred composition, the crosslink density controlling co-reactive monomer (B) comprises a monofunctional short chain monomer which is copolymerizable with the end caps of the moderate-to-long chain prepolymer (A) and miscible with or soluble in the prepolymer (A). Preferably the monomer is of high molecular weight, low volatility, enhances the flow characteristics of the prepolymer, has a good high temperature performance, high cross-linking ability and reacts efficiently with the prepolymer. In a preferred embodiment of the invention the comonomer comprises the monomethacrylate or monoacrylate ester of an aryl, alkyl or arylalkyl alcohol, or their arylamino, alkylamino and arylakylamino methacrylate or acrylate esters.

Substituted $C_1$–$C_{10}$ alkyl acrylates and methacrylates are preferred. The substituents may be hydroxy, alkoxy, aryl, aryloxy, or cyclohexyl, for example. Phenyl substituted alkyl methacrylates and acrylates are particularly preferred, especially phenyl propyl methacrylate, as it has been found that the resulting polymers have better flexibility at high temperature (up to 150° C.) than those made from other monomers.

The short chain monomer (B) preferably comprises from 50 mole percent (one monofunctional monomer unit for every difunctional prepolymer unit) to about 98 mole percent (fifty monofunctional monomer units for every difunctional prepolymer unit) and preferably will comprise about 91 mole percent (ten monofunctional monomer units for every difunctional prepolymer unit) to about 95 mole percent (twenty monofunctional monomer units for every difunctional prepolymer unit).

The short chain monomer (B) must be soluble in or miscible with the moderate-to-long chain prepolymer. Solubility or miscibility of the co-reactive monomer and the chain transfer and coupling agents in the moderate-to-long chain prepolymer readily may be determined by blending the co-reactive monomers, and the moderateto-long chain prepolymer, and visually inspecting for solubility or miscibility.

It will be understood that variations in softness or hardness may be obtained by varying the levels and type of monomer used, as discussed in U.S. Pat. No. 4,439,600.

Initiator

The initiator system preferably comprises a free-radical initiator of the organic peroxy, hydroperoxy, perester or peracid type or other free radical initiator type as described in U.S. Pat. Nos. 4,439,600 or 4,451,615. Included within this definition are materials such as organic peroxides or organic peresters which decompose to produce free radicals in situ. Examples of such peroxides and peresters are cyclohexyl hydroxycyclohexyl peroxide and t-butyl perbenzoate, respectively.

While the nature of the free radical initiator is not critical to the broad concept of this invention, the preferred organic peroxides and hydroperoxides can be represented by the formulae:

  VII      (A)

and

  VII      (B)

wherein $R^{15}$ is a hydrocarbon or carbonyl or mixture of carbonyl and hydrocarbon groups containing up to about 18 carbon atoms, and preferably is an alkyl, aryl or aralkyl hydrocarbon group containing from about 3 to about 12 carbon atoms. Naturally $R^{15}$ can contain any substituent or linkage, hydrocarbon or otherwise, which does not affect the peroxide or hydroperoxide adversely for the purpose disclosed herein. Typical examples of such organic peroxides are benzoyl peroxide, tertiary butyl peroxide, and tertiary butyl peroxybenzoate. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane and cyclohexene and various ketones and ethers, including certain compounds represented by the general formula VII(B) above.

The polymerization initiator system which is used commonly comprises less than about 10 percent by weight of the combination of the polymerizable monomer and initiator and preferably comprises from about 0.1 percent to about 5 percent of the combination.

Ultraviolet ("UV") activated initiators may also be employed as polymerization initiators. Many UV activated polymerization initiators are known in the art and may be advantageously employed in the invention. For example, the UV activated initiators may be selected from metal carbonyls of the formula $M_x(CO)_y$ wherein M is a metal atom, x is 1 to 2, and y is an integer determined by the total valence of the metal atoms, generally 4 to 10. The preferred UV activated initiators are selected from (a) $C_{1-16}$ straight or branched chain alkyl diones; and (b) carbonyl compounds of the general formula $R^5(CO)R^6$ wherein $R^5$ is a $C_{1-10}$ alkyl, aryl, aralkyl or alkaryl group, and $R^6$ is $R^5$ or hydrogen. In addition, $R^5$ or $R^6$ can contain any substituents which do not adversely affect the compound in serving its function. For example, $R^5$ or $R^6$ can be alpha-substituted with an alkyl, aryl, alkaryl, alkoxy or aryloxy radical, or with an amino or a mono- or dialkylamino derivative thereof, each of the above substituents containing up to about six carbon atoms. In addition, $R^5$ and $R^6$ taken together with carbonyl group form an aromatic or heterocyclic ketone containing up to about 16 carbon atoms. When using UV activated initiators it is frequently desired to add low levels, such as up to about 500 parts per million by weight, of a free-radical or UV stabilizer, many of which are known in the art, to prevent spurious polymerization of the composition prior to the time of its intended use. Suitable free-radical stabilizers are hydroquinone, p-benzoquinone, butylate of hydroxytoluene, and butylate of hydroxyanisole.

If a UV initiator is used, the composition is exposed to ultraviolet radiation immediately before or during injection.

Activation

Unless a UV-activated initiator or heat-activated initiator is used, an activator will be required. It is preferred to use a redox activation system with an activator and one or more accelerators, the activator being kept separate from the initiator prior to injection by use of a multi-part composition or surface primer.

Activator

The polymerization activator may suitably be a transition metal compound, particularly an organo metallic compound or salt in which the transition metal is oxidisable. Most typically the transition metal is selected from the class consisting of copper, iron, manganese and cobalt. The compounds are exemplified by cobalt naphthenate, copper hexanoate, lead naphthenate, and cobalt octoate. Other suitable activators include primary secondary or tertiary amines, aldehyde-amine condensation products, such as a butyraldehyde-aniline condensation product, or reducing agents such as dihydropyridine or substituted thiourea. The activator is suitably present at a level between about 0.05 and 10 percent by weight of the polymerisable monomer.

Accelerator(s)

Preferably the composition also includes an accelerator of free-radical polymerisation with or without a co-accelerator. Such accelerators may be used in concentrations of less than 1% by weight, the preferred range being about 0.1% to about 0.75%. Suitable accelerators or co-accelerators include amines, amides or imides, more particularly sulfimides such as benzoic sulfimide (saccharin), rhodamine or organic hydrazides as described in U.S. Pat. No. 3,491,076 Bachman. Other suitable accelerators include the hydrazine derivatives described in U.S. Pat. No. 4,287,330 Rich which may be used in combination with an acid as described in U.S. Pat. No. 4,180,640 Melody et al. A particularly preferred accelerator combination is saccharin and acetyl phenyl hydrazine.

Additives

Other additives known to the art may also be employed as needed—it is recommended that a stabiliser, chelator, and/or inhibitor be present in the composition for optimum performance. These additives may be chosen from any of those known to persons skilled in the art for use in acrylic compositions, and may be used in amounts from about 0.1 to 1% by weight of the composition. The presently preferred metal chelating agents are ethylene-diamine tetracetic acid (EDTA) and its sodium salt, 1,1-ethylenebis-nitril methylidyne dipyridine and the class of beta-diketones.

Preferred inhibitors are those in the groups consisting of hydroquinones, benzoquinones, naphthoquinones, phenanthraquinones, anthraquinones and substituted compounds thereof. Additionally, various phenols can be employed as inhibitors, the preferred one being 2,6-tert.-butyl-4-methyl phenol. Inhibitors are typically used in concentration of about 10–1,000 parts per million by weight.

Fillers

It is recommended to use a polymeric liquid filler to reduce shrinkage in the elastomer (preferably down to less than 5% shrinkage) and to maintain the viscosity of the composition. The filler should be inert and compatible with the monomers. The preferred filler is a polybutylacrylate suitably having a molecular weight in the range 30,000 to 200,000. The filler is preferably present in an amount of 5 to 20 percent by weight of the composition.

Solid fillers, for example of the flake type such as mica or finely divided polytetrafluorethylene or polyethylene may be used and be chosen so as not to interfere with the flow of the composition when it is being injected.

Also known are a wide variety of thickeners, plasticisers, adhesion promoters, dyes, etc. which may optionally be used in concentrations as desired, provided of course that they do not substantially interfere with the function of the free radical curing system. Typical of these additives are the silica-based and castor oil based thixotropic agents and plasticisers and adhesion promoters such as those derived from silanes e.g. the alkoxy silanes.

Thickeners, together with fillers, may be particularly desirable if the monomers do not comprise a prepolymer (A) and short chain monomer (B) as described above.

In the preferred embodiment, the composition is prepared in two parts. Part I preferably contains the prepolymer A, the short chain monomer B and the initiator together with a metal chelating agent, inhibitor and reducing agent. Part II preferably contains the prepolymer A, the short chain monomer B, and a metallic salt activator together with the filler and an inhibitor. Part II does not contain a source of free radicals. Activation of the initiator C does not occur until the two Parts I and II are mixed.

The two Parts I and II are preferably formulated so that they can be mixed in easily controlled proportions, more particularly in equal proportions. Most suitably the two Parts I and II are mixed in a chamber at the injection nozzle.

The metal chelating agent is present in Part I in a small amount which is not sufficient to interfere with the activating action of the metallic salt activator when the two Parts are mixed. The mixed system preferably begins to gel after 2–3 minutes at ambient temperature.

With the composition of the present invention, it is not necessary to use a surface primer. Such primers generally have to be applied from solution in an organic solvent and the removal of the solvent is potentially hazardous. Nevertheless it may be convenient to prime the substrate surface with an activator to increase the speed of cure.

As an alternative to preparation of the composition as a two-part or multi-part composition, the initiator and activator may be isolated from each other within a one-component formulation e.g. by a physical membrane separation, preferably by microencapsulation of either the initiator or the activator, optionally together with one or more other ingredients of the composition. If a 2 part blowing system is being used (as described below), one of the reactive ingredients for it should also be isolated e.g. by microencapsulation. The isolating membrane e.g. of the microcapsules may be ruptured at the time of injection of the composition, e.g. by physical means, or by sonic treatment, UV treatment or heat treatment.

Expansion System

Various known methods of overcoming volume reduction upon polymerization rely on an expansion effect which is achieved during polymerization by means of the addition of one of three principal compound types. The first method involves the use of low boiling solvents which are incorporated in the formulation. During curing, heat in excess of the boiling temperatures of the solvent is applied to the system whereby the solvent is evaporated and the gas causes the curing polymer to expand. Examples of such solvents are dichloromethane, 1,1,1-trichloroethane and solvents based on trichlorotrifluoroethane (as sold under the Trade Mark FREON). However, the addition of low boiling solvents is undesirable as residues may remain following heating. Such residues may undergo chemical reaction with solvents coming into contact with the gasket thereby causing the seal to deteriorate. Furthermore, in-situ heating of the components being gasketed may be impractical as this could necessitate applying heat to a complete engine. In particular, the application of high temperatures to components being gasketed may result in the deterioration of the component itself.

The second method employed to produce expansion/foaming during curing involves the incorporation of heat-activated blowing agents in the composition. The blowing agent may be a solid, liquid or gaseous substance. The agent acts as the source of gas which produces a cellular structure in polymers. Upon heating of the formulation to the activation temperature of the blowing agent, a physical change in state or chemical decomposition of the blowing agent occurs wherein a gas is released and expansion of the polymer results. Examples of such blowing agents include Azodicarbonamide and Benzenesulphonyl hydrazide. The principal disadvantages associated with blowing agents are that heating is once again required and furthermore an undesirable residue may remain. However, the activation temperature may be reduced somewhat by means of catalysts or "kickers". Examples of such catalysts include zinc oxide, zinc acetate and p-toluenesulphonic acid. Nevertheless, heat activation is still required which is not desirable in in-situ gasketing.

The third method of achieving an expansion/foaming effect during curing is the preferred method. A gas forming reaction which takes place at room temperature (or ambient temperature) is utilized, thereby eliminating the need to apply heat to the system or to rely on heat generated in an exothermic reaction. By "room temperature" or "ambient temperature" is meant a temperature not greater than about 35° C., generally not greater than about 25° C. Furthermore, two gas-forming reactants are easily incorporated into two separate parts of the gasket-forming composition of this invention, one reactant in each part of the composition.

Preferably the reactants are an acid and a bicarbonate, such as acrylic or maleic acid and sodium, potassium or ammonium bicarbonate. The reactants, if solid, should be in solution, so that they can be dispersed through the composition prior to mixing at the injection nozzle. Suitably, dispersion can be maintained over long periods by means of surfactants such as Triton X-100 and DC 190. Aqueous solution is preferred because water not only acts as a carrier but also provides a polar medium in which the reaction can occur. The expansion achieved is suitably in the range 5-20% by volume of the elastomer.

Alternatively a chemical blowing agent may be used. The second method described above utilizing kickers is particularly adapted for use with the invention because the blowing agent can be incorporated into one part of the composition and the "kicker" can be incorporated in the other part of the composition.

Advantageously, the level of the expansion-causing components is maintained at less than 5% by weight.

Separation of the expansion reactants is advantageous because it gives good shelf life to the system. However the use of expansion reactants in a gasketing composition is believed to be novel in itself and to form an inventive feature.

BRIEF DESCRIPTION OF THE DRAWINGS

As shown in FIG. 1, a suitable groove 1, in which a gasket may be produced in accordance with the invention, is formed in a flange 2. The groove 1 follows a continuous path around the area of the flange 2. In addition, the flange 2 has an entry port 3 through which gasketing compositions of the invention are injected into the groove 1 via a channel 4.

Typical dimensions for the groove 1 would be a width of 3 mm and a depth of 1.5 mm.

Figure 1:
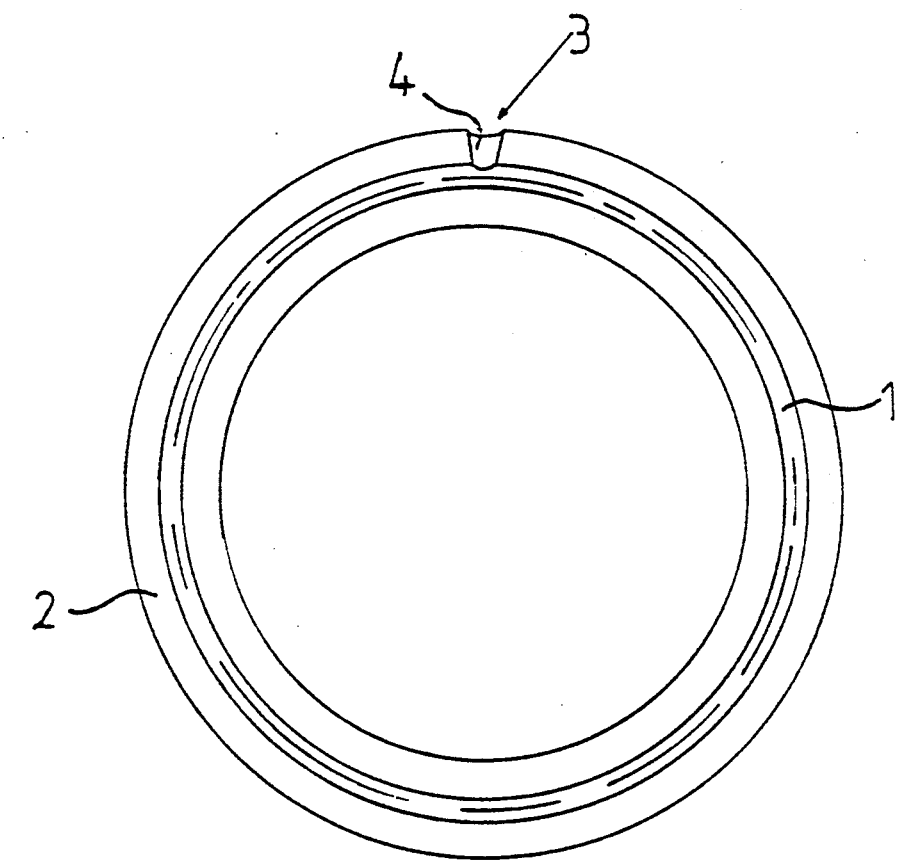
FIG. 1 is a pictorial view of a flange with a groove.
Figure 2:
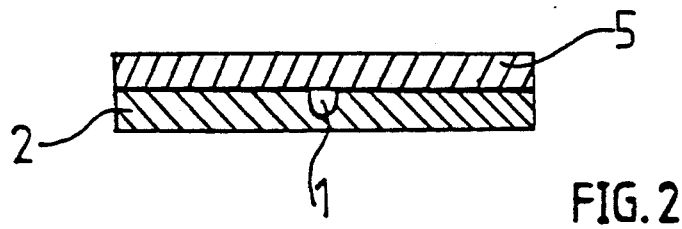
FIG. 2 is a cross section through two mating flanges, one of which is the flange of FIG. 1.

FIG. 2 shows the flange 2 of FIG. 1 mated with a second flange 5. The second flange 5 encloses the groove 1 so that upon injection of a gasketing composition into the groove 1 a seal is produced between the mating flanges.

The system was designed to meet the following Performance Profile:

It should be injectable to form a gasket between components of die cast aluminium, cast iron and/or injection moulded plastic (e.g. glass filled nylon). One component has a groove with a cross sectional area up to 9 sq. mm (3 mm×3 mm). Injection pressure should not exceed 80 p.s.i. The injection cycle should be not more than 25 seconds, preferably 20 seconds or less.

The system should operate without any primer being applied to the surface of either component. No degreasing should be required on machine-oil contaminated surfaces. Sufficient cure or gelling should have taken place to withstand an oil pressure test at 90 p.s.i. (90° C.), 5 minutes after injection. No corrosion should occur in the joint on or after curing.

The gasket should operate over a temperature range from −40° C. to +150° C. It should withstand oil pressure of 90 p.s.i. at 150° C. and an oil/petrol (gasoline) mix pressure of 90 p.s.i. at 120° C. It should also withstand a water/glycol mix under a pressure of 30 p.s.i. at 150° C. These conditions are tested statically for a duration of 1000 hours.

The two gasketted components should be easy to strip down and the gasket should be easy to remove from the groove.

DESCRIPTION OF THE PREFERRED EMBODIMENTS

The invention is illustrated in the following non-limiting Examples.

EXAMPLE 1

A 2 part composition was made up as follows:

| | Parts by Weight |
|---|---|
| Part I | |
| Dimethacrylate Terminated Urethane Polyester | 67 |
| Phenylpropyl Methacrylate | 27 |
| Naphthaquinone Stabiliser | 0.4 |
| EDTA Stabiliser | 2 |
| Saccharin | 0.6 |
| Acetyl Phenyl Hydrazine | 0.5 |
| Cumene Hydroperoxide | 2.5 |
| Part II | |
| Dimethacrylate terminated urethane polyether glycol | 55 |
| Phenylpropyl methacrylate | 27 |
| Polybutyl acrylate (Acronal 4F) | 17 |
| Naphthoquinone Stabiliser | 0.1 |
| Cobalt Naphthenate Activator | 0.9 |

The dimethacrylate terminated urethane polyester used in this and subsequent Examples is based on poly(-diethylene glycol adipate) with approximate molecular weight of 3,000.

The dimethacrylate terminated urethane polyester glycol used in this Example and Example 2 is based on a polyether based on the polyoxypropylene derivative of trimethylol propane with approximate molecular weight of 3,000.

Acronal 4F is a liquid polybutyl acrylate resin available from B.A.S.F.

The two-part formulation of the invention comprises a two-part cure system as described hereinabove. The cumene hydroperoxide of Part I initiates the free radical polymerization process, when activated. However, cumene hydroperoxide requires the presence of a suitable metal ion for activation. Activation of cumene hydroperoxide is prevented in Part I, prior to mixing with Part II, by means of the Naphthaquinone and EDTA stabilisers whereby any trace amounts of metals which may be present in Part I are complexed by the stabilisers and prevented from activating initiation of the polymerization.

Part II contains a stabiliser, Naphthoquinone, and the initiation activator cobalt naphthenate. Part II does not contain a source of free radicals.

Parts I and II were placed in separate barrels of a double barrelled syringe and mixed in a chamber at the injection nozzle. The mixed composition had a viscosity of 7,000 mPas at 25° C. measured on a Brookfield RVT viscometer with Spindle 3 at 20 r.p.m. It was injected into a groove between two flanges using a pressure of approximately 5 bar. A groove 3 mm wide×1.5 mm deep by 45 cms long was injected in approximately 15 seconds. The composition flowed along the groove and into the space between the two flanges. It gelled in-situ to a non-flowable state 2-3 minutes after mixing. The flexible gasket formed was tested to resist 90 p.s.i. (90° C.) oil pressure 5 minutes after injection.

The system described in Example 1 performed satisfactorily under the conditions set out in the Performance Profile. In particular, the system exhibited extremely good flow characteristics and wettability; it is not necessary to pretreat oil contaminated surfaces. Furthermore, the two-part cure system resulted in a very short cure time and gasket-testing was possible after five minutes. An anaerobic system alone would be substantially slower and would not be effective on aluminum or plastic substrates. No liquid remained after the composition had cured, thus eliminating leaking out. The cured composition was found to be extremely stable and the components were found to be easily serviceable wherein facile strip down and removal of the cured gasket from the groove was possible. Volume reduction was acceptable at less than 5%.

In a particularly preferred embodiment of the present invention volume reduction upon polymerization is eliminated by means of the inclusion of gas-forming reactants in the two-part formulation. Example 2 describes a system similar to that described hereinabove comprising gas-forming reactants.

EXAMPLE 2

The following 2-part composition was prepared:

| | Part by Weight |
|---|---|
| Part I | |
| Dimethacrylate Terminated Urethane Polyester | 66 |
| Phenylpropyl Methacrylate | 26 |
| Naphthaquinone Stabiliser | 0.4 |
| EDTA Stabiliser | 2.0 |
| Saccharin | 1.0 |
| Acetyl Phenyl Hydrazine | 0.5 |
| Cumene Hydroperoxide | 2.1 |
| Acrylic acid | 2.0 |
| Part II | |
| Dimethacrylate terminated urethane polyether glycol | 55 |
| Phenyl propyl methacrylate | 25 |
| Polybutyl acrylate | 17 |
| Naphthaquinone Stabiliser | 0.1 |
| Cobalt Naphthenate | 0.8 |
| Potassium Bicarbonate Solution | 8.0 |
| DC 190 Surfactant | 1.0 |

Note: The potassium bicarbonate solution consists of 25% by weight potassium bicarbonate in water.

DC 190 is a silicone glycol surfactant supplied by Dow Corning Limited.

The formulations described in Example 2 are similar to those described in Example 1 with the exception of the inclusion of 2 parts by weight of an acid in Part I and 2 parts by weight of bicarbonate in Part II.

The expansion reactants herein described are water-based and are easily dispersed in the acrylic formulation. Suitably, dispersion can be maintained over prolonged periods by means of surfactants such as Triton X-100 and DC-190.

Application of the present formulations to injection gasketing was effected analogously to that described in Example I. Furthermore, polymerization or curing proceeded analogously. However, upon injection, reaction of the acrylic acid and potassium bicarbonate resulted in the release of gas thereby effecting expansion of the curing polymer. The foaming reaction and initial gelling of the composition to a non-flowable state both occurred during a period of 3 minutes after mixing. The expanded cured polymer formed a flexible gasket having an integral structure through which bubbles were uniformly dispersed.

The present embodiment therefore minimises volume reduction during polymerization thereby ensuring an efficient liquid-tight gasket.

EXAMPLE 3

The following 3-part composition was prepared:

| | Parts by weight |
|---|---|
| Part 1 | |
| Dimethacrylate terminated urethane polyester | 68.0 |
| Phenylpropyl methacrylate | 19.5 |
| Naphthaquinone Stabiliser | 0.5 |
| EDTA Stabiliser | 2.0 |
| Saccharin | 1.5 |
| Acetyl phenyl hydrazine | 1.0 |
| Cumene hydroperoxide | 2.5 |
| Acrylic acid | 5.0 |
| Part 2 | |
| Dimethacrylate terminated urethane polyester | 65.0 |
| Phenylpropyl methacrylate | 33.0 |
| Cobalt naphthenate | 1.5 |
| Naphthaquinone stabiliser | 0.5 |
| Part 3 | |
| Dimethacrylate terminated urethane polyester | 64.0 |
| Phenylpropyl methacrylate | 27.0 |
| Potassium bicarbonate solution | 8.0 |
| DC 190 Surfactant | 1.0 |

Note: The potassium bicarbonate solution consists of 25% by weight of potassium bicarbonate in water.

The 3-part composition had increased shelf life as compared to that of Example 2. The 3 components had approximately the same viscosity which was approximately 6000 mPas when measured as in Example 1.

Application of the composition is analogous to that of Examples 1 and 2 except that a triple-barrelled injection gun is used with a mixing nozzle incorporating a static mixer. The mixing ratio of the 3 parts is 1:1:1.

Curing of the composition after mixing proceeded in the same manner as in Example 2, with gas being released to effect expansion of the curing polymer. A flexible gasket was formed having discrete bubbles dispersed through its structure.

We claim:

1. A method of forming a gasket in a machine or engine in-situ wherein the method comprises:
   1) mating two components of the machine or engine in a face-to-face relationship, each of said components having a mating face, at least one of said faces having a groove therein for defining the gasket and an inlet thereto for injecting a gasket forming composition into the groove;
   2) injecting into the groove a curable gasket forming composition comprising one or more cross-linkable, free-radically polymerizable vinyl esters, a free radical polymerization initiator therefor, alone or in combination with an activator for said free-radical polymerization initiator and, optionally, a free-radical inhibitor, said composition having a Brookfield viscosity at the time of injection of from about 2,000 to about 15,000 mPas at 25° C. and gelling to a non-flowable state within five (5) minutes of the initiation of the cure and having the consistency of a flexible solid upon full cure, wherein the composition further comprises one or more constituents for minimizing volume reduction otherwise manifested on curing of the composition; and 3) allowing or enabling the composition to cure.

2. A method according to claim 1 wherein the composition comprises:
   (A) a moderate-to-long chain di- or polyfunctional prepolymer having vinyl reactive ends;
   (B) a cross link controlling monomer which is (i) reactive with said moderate-to-long chain di- or polyfunctional prepolymer, and (ii) soluble in or miscible with the moderate-to-long chain prepolymer;
   (C) a free radical polymerization initiator; and
   (D) a polymerization activator.

3. A method according to claim 2 wherein the composition is a multi-part composition wherein one part contains the initiator and another part contains the activator, the method further comprising the step of mixing the parts at the time of injection to initiate cure.

4. A method according to claim 2 wherein the composition is a 2-part composition formulated as follows:

| Part I |
| --- |
| Prepolymer (A), monomer (B) and initiator (C); |
| Part II |
| Prepolymer (A), monomer (B) and activator (D). |

5. A method according to claim 1 wherein the consituent for minimizing volume reduction is a liquid filler.

6. A method according to claim 1 wherein the constituent for minimizing volume reduction is a volume expansion system and the method further comprises effecting expansion of said volume expansion system.

7. A method according to claim 6 wherein the volume expansion system comprises two expansion reactants, each in a separate part of the composition prior to injection, which react at room temperature to form a gas in-situ in the composition.

8. A method according to claim 7 wherein one of the reactants is an acid and the other is a bicarbonate.

9. The method of claim 1 wherein the surface of the groove is primed with an activator prior to mating the two components.

10. The method of claim 1 wherein the cure intiator is activated at the time of injection.

* * * * *